(12) United States Patent
Kim et al.

(10) Patent No.: US 7,018,692 B2
(45) Date of Patent: Mar. 28, 2006

(54) PENETRATION RESISTANT FABRIC WITH MULTIPLE LAYER GUARD PLATE ASSEMBLIES AND METHOD OF MAKING THE SAME

(75) Inventors: Young-Hwa Kim, Hudson, WI (US); Nicole Smith, St. Paul, MN (US); Hong Ji, Woodbury, MN (US)

(73) Assignee: Higher Dimension Medical, Inc., Oakdale, MN (US)

( * ) Notice: Subject to any disclaimer, the term of this patent is extended or adjusted under 35 U.S.C. 154(b) by 121 days.

(21) Appl. No.: 10/036,740

(22) Filed: Dec. 31, 2001

(65) Prior Publication Data

US 2002/0106953 A1  Aug. 8, 2002

Related U.S. Application Data

(63) Continuation-in-part of application No. 09/610,748, filed on Jul. 6, 2000, now Pat. No. 6,962,739.

(51) Int. Cl.
*B32B 3/14* (2006.01)
*B32B 3/16* (2006.01)
*B32B 3/06* (2006.01)
*B32B 9/00* (2006.01)
*B32B 5/12* (2006.01)
*B32B 3/00* (2006.01)
*B32B 27/04* (2006.01)
*B32B 27/12* (2006.01)
*B32B 5/02* (2006.01)

(52) U.S. Cl. .......................... 428/51; 428/103; 428/189; 428/190; 428/911; 442/66; 442/71; 442/134; 442/135

(58) Field of Classification Search .................. 442/66, 442/71, 134, 135, 148; 428/103, 911, 77, 428/189, 51, 78, 190, 195, 201, 195.1
See application file for complete search history.

(56) References Cited

U.S. PATENT DOCUMENTS

| | | | |
|---|---|---|---|
| 3,179,551 A | 4/1965 | Dudas | 161/116 |
| 3,227,574 A | 1/1966 | Mohr | 117/45 |
| 3,553,066 A | 1/1971 | Cavalier et al. | 161/73 |
| 3,633,216 A | 1/1972 | Schinholtz | 2/168 |

(Continued)

FOREIGN PATENT DOCUMENTS

CH            273660            2/1951

(Continued)

OTHER PUBLICATIONS

U.S. Appl. No. 09/610,748, filed Jul. 6, 2000, Kim.

*Primary Examiner*—Elizabeth M. Cole
*Assistant Examiner*—Jeremy R. Pierce
(74) *Attorney, Agent, or Firm*—LInda P. Ji; Westman, Champlin & Kelly

(57) ABSTRACT

A fabric includes a fabric substrate and a plurality guard plate assemblies affixed to the fabric substrate in a spaced relationship to each other. Each guard plate assembly includes a first layer of material affixed to the fabric substrate and a second layer of material joined to the first layer of material on a surface opposite the fabric substrate. The second layer of material has characteristics different than the first layer of material and are chosen commonly to meet the demands of the application to which the fabric is designed.

15 Claims, 4 Drawing Sheets

U.S. PATENT DOCUMENTS

| | | | | |
|---|---|---|---|---|
| 3,813,281 | A | 5/1974 | Burgess et al. | 161/159 |
| 3,867,727 | A | 2/1975 | Povlacs | 2/161 R |
| 3,952,358 | A * | 4/1976 | Fukuoka | 12/142 MC |
| 4,055,029 | A | 10/1977 | Kalbow | 51/395 |
| 4,082,878 | A | 4/1978 | Boe et al. | 428/195 |
| 4,142,334 | A | 3/1979 | Kirsch et al. | 51/395 |
| 4,442,150 | A | 4/1984 | Greiner et al. | 428/53 |
| 4,569,874 | A | 2/1986 | Kuznetz | 428/109 |
| 4,603,069 | A | 7/1986 | Haq et al. | 428/76 |
| 4,623,574 | A | 11/1986 | Harpell et al. | 428/113 |
| 4,742,578 | A | 5/1988 | Seid | 2/2.5 |
| 4,793,354 | A | 12/1988 | Wright et al. | 128/630 |
| 4,810,559 | A | 3/1989 | Fortier et al. | 428/161 |
| 4,833,733 | A | 5/1989 | Welch et al. | 2/169 |
| 4,858,245 | A | 8/1989 | Sullivan et al. | 2/21 |
| 4,861,666 | A | 8/1989 | LeGrand et al. | 428/34 |
| 4,864,661 | A | 9/1989 | Gimbel | 2/167 |
| 4,881,277 | A | 11/1989 | Hogle | 2/169 |
| 4,901,372 | A | 2/1990 | Pierce | 2/167 |
| 4,916,000 | A | 4/1990 | Li et al. | 428/105 |
| 4,919,966 | A | 4/1990 | Shlenker | 427/2 |
| 4,995,119 | A | 2/1991 | Codkind | 2/163 |
| 5,020,162 | A | 6/1991 | Kersten et al. | 2/164 |
| 5,070,540 | A | 12/1991 | Bettcher et al. | 2/2.5 |
| 5,070,543 | A | 12/1991 | Beck | 2/163 |
| 5,079,543 | A | 1/1992 | Pircher | |
| 5,087,499 | A | 2/1992 | Sullivan | 428/85 |
| 5,093,933 | A | 3/1992 | Berry | 2/161 R |
| 5,132,167 | A | 7/1992 | Prato | 428/251 |
| 5,138,719 | A | 8/1992 | Orlianges et al. | 2/168 |
| 5,156,900 | A | 10/1992 | Nishimura et al. | 428/151 |
| 5,172,424 | A | 12/1992 | Adkins | 2/21 |
| 5,173,966 | A | 12/1992 | DeLeo | 2/167 |
| 5,187,023 | A | 2/1993 | Prevorsek et al. | 428/911 |
| 5,187,815 | A | 2/1993 | Stern et al. | 2/161 R |
| 5,196,252 | A | 3/1993 | Harpell | 428/102 |
| 5,200,263 | A | 4/1993 | Gould et al. | 428/323 |
| 5,210,877 | A | 5/1993 | Newman | 2/2 |
| 5,213,588 | A | 5/1993 | Wong et al. | 51/293 |
| 5,231,700 | A | 8/1993 | Cutshall | 2/161.7 |
| 5,259,069 | A | 11/1993 | Gimbel | 2/163 |
| 5,306,532 | A | 4/1994 | Tsien et al. | 428/33 |
| 5,308,683 | A | 5/1994 | Dees, Jr. et al. | 428/195 |
| 5,317,759 | A | 6/1994 | Pierce | 2/161.7 |
| 5,335,373 | A | 8/1994 | Dresdner, Jr. et al. | 2/161.7 |
| 5,336,555 | A | 8/1994 | Darras et al. | 428/247 |
| 5,345,612 | A | 9/1994 | Stein | 2/168 |
| D351,930 | S | 10/1994 | Snider et al. | D29/113 |
| 5,357,636 | A | 10/1994 | Dresdner, Jr. et al. | 2/161.7 |
| 5,368,930 | A | 11/1994 | Samples | 428/323 |
| 5,407,612 | A | 4/1995 | Gould et al. | 264/24 |
| D358,245 | S | 5/1995 | DeLeo | D2/617 |
| 5,421,033 | A | 6/1995 | DeLeo | 2/161.7 |
| 5,423,090 | A | 6/1995 | Gimbel | 2/161.7 |
| 5,425,142 | A | 6/1995 | Scott | 2/19 |
| 5,428,841 | A | 7/1995 | Stein | 2/168 |
| 5,429,678 | A | 7/1995 | Fany | 134/6 |
| 5,442,815 | A | 8/1995 | Cordova et al. | 2/161.7 |
| 5,442,816 | A | 8/1995 | Seketa | 2/161.7 |
| 5,448,777 | A | 9/1995 | Lew | 2/161.7 |
| 5,459,879 | A | 10/1995 | Fuchs | 2/161.7 |
| 5,488,777 | A | 2/1996 | Erdesky | |
| 5,500,957 | A | 3/1996 | Stein | 2/169 |
| 5,511,241 | A | 4/1996 | Ziegler | 2/2.5 |
| 5,515,548 | A | 5/1996 | Lazarus | 2/169 |
| 5,548,844 | A | 8/1996 | Ceresia | 2/161.7 |
| 5,564,127 | A | 10/1996 | Manne | 2/161.7 |
| 5,568,657 | A | 10/1996 | Cordova et al. | 2/167 |
| 5,569,348 | A | 10/1996 | Hefele | 156/239 |
| 5,575,296 | A | 11/1996 | Peck | 128/880 |
| 5,601,895 | A | 2/1997 | Cunningham | 428/66.6 |
| 5,626,949 | A | 5/1997 | Blauer et al. | 428/196 |
| 5,632,948 | A | 5/1997 | Moore | 264/243 |
| 5,644,797 | A | 7/1997 | Daneshvar | 2/161.7 |
| 5,665,810 | A | 9/1997 | Patchett et al. | 524/449 |
| 5,677,029 | A | 10/1997 | Prevorsek et al. | 428/113 |
| 5,687,424 | A | 11/1997 | Masley | 2/163 |
| D389,608 | S | 1/1998 | Kraatz | D29/123 |
| 5,706,520 | A | 1/1998 | Thornton et al. | 2/21 |
| 5,709,920 | A | 1/1998 | Danton | 428/68 |
| 5,745,919 | A | 5/1998 | Kraatz | 2/161.6 |
| 5,752,279 | A | 5/1998 | Hochmuth | 2/161.1 |
| 5,759,626 | A | 6/1998 | Hefele | 427/265 |
| 5,761,743 | A | 6/1998 | Andrews et al. | 2/21 |
| 5,773,373 | A | 6/1998 | Wynne et al. | 442/260 |
| 5,789,327 | A | 8/1998 | Rousseau | 442/135 |
| 5,799,333 | A | 9/1998 | McGarry et al. | 2/161.6 |
| 5,853,854 | A * | 12/1998 | Nakanishi et al. | 428/172 |
| 5,853,863 | A | 12/1998 | Kim | 428/223 |
| 5,854,143 | A | 12/1998 | Schuster et al. | 442/135 |
| 5,855,991 | A | 1/1999 | McLarty, III | 428/195 |
| 5,883,021 | A | 3/1999 | Beer et al. | 442/172 |
| 5,906,873 | A | 5/1999 | Kim | 428/57 |
| 5,925,441 | A | 7/1999 | Blauer et al. | 428/196 |
| 5,935,678 | A | 8/1999 | Park | 428/105 |
| 5,943,694 | A * | 8/1999 | Moureaux et al. | 428/911 |
| 5,953,751 | A | 9/1999 | Kobren | 2/16 |
| 6,000,055 | A | 12/1999 | Citterio | 2/2.5 |
| 6,020,057 | A | 2/2000 | Darras | 428/323 |
| 6,035,438 | A * | 3/2000 | Neal et al. | 428/101 |
| 6,080,474 | A | 6/2000 | Oakley et al. | 428/323 |
| 6,087,279 | A | 7/2000 | Laun | 442/402 |

FOREIGN PATENT DOCUMENTS

| | | |
|---|---|---|
| DE | 25 38 440 A1 | 2/1977 |
| DE | 29 27 653 | 1/1981 |
| DE | 29 27 653 A1 | 1/1981 |
| DE | 2 130 073 A | 5/1984 |
| DE | 39 38741 A1 | 3/1991 |
| DE | 3938741 A1 | 3/1991 |
| EP | 0 028 476 | 5/1981 |
| EP | 0 028 476 A1 | 5/1981 |
| EP | 0 053 201 A1 | 6/1982 |
| EP | 0 657 110 A1 | 6/1995 |
| FR | 2 315 897 | 1/1977 |
| GB | 2 130 073 A | 5/1984 |
| GB | 2 287 639 | 9/1995 |
| GB | 2 302 794 | 2/1997 |
| WO | WO92/08094 | 5/1992 |
| WO | WO 92/20520 | 11/1992 |
| WO | WO93/21492 | 10/1993 |
| WO | WO 01/29299 A2 | 10/2000 |
| WO | WO 01/29299 A2 | 4/2001 |

* cited by examiner

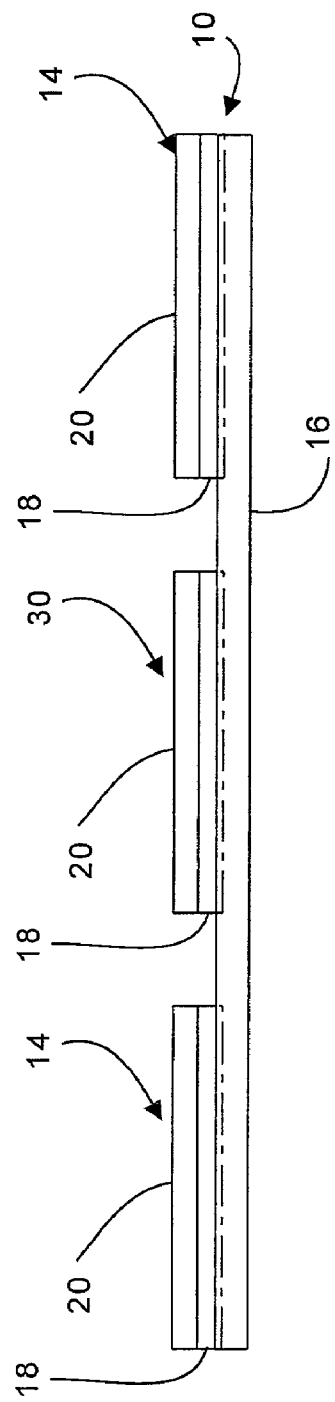
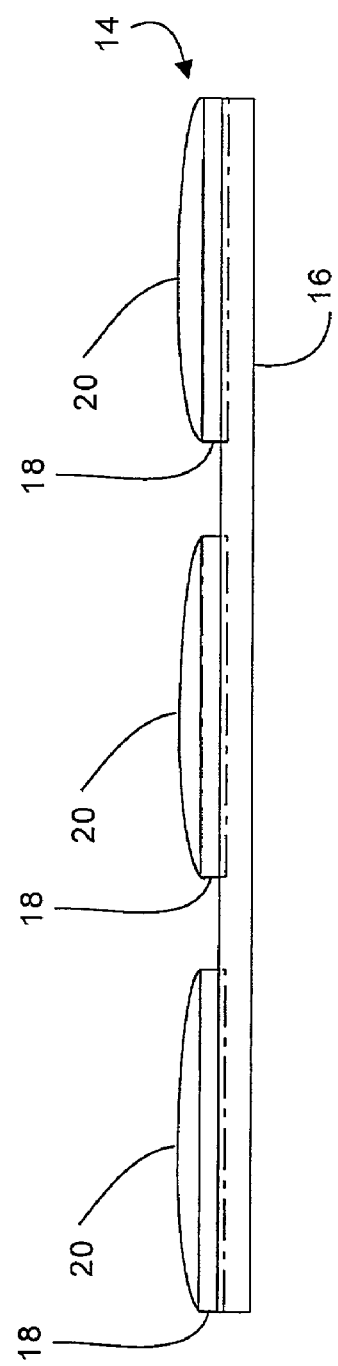

PENETRATION RESISTANT FABRIC WITH MULTIPLE LAYER GUARD PLATE ASSEMBLIES AND METHOD OF MAKING THE SAME

CROSS-REFERENCE TO RELATED APPLICATION

This application is a continuation-in-part of U.S. patent application Ser. No. 09/610,748, filed Jul. 6, 2000, now U.S. Pat. No. 6,962,739, the priority of which is claimed, and the content of which is incorporated herein by reference in its entirety.

BACKGROUND OF THE INVENTION

The present invention relates generally to a puncture, pierce and cut resistant fabric. More particularly, the present invention relates to a fabric with the aforementioned characteristics that also has outer surface or layer with properties tailored to specific applications such as being more wear resistant or having a higher friction coefficient to resist slippage when the fabric is in contact with an article.

Various forms of protective fabrics have been advanced and used to form protective garments such as gloves, aprons and arm guards and the like. Besides providing protective functions such as cut and puncture resistance, the fabric material may also have to be flexible, durable, resist abrasion or improve or allow the gripping or holding of objects.

Many forms of protective garments have utilized fabrics made from woven or non-woven forms of fibers and yarns. Some commonly used fibers include cellulose (cotton), polyester, nylon, aramid (KEVLAR), acrylic and Ultra-High Molecular Weight Polyethylene (Spectra). Nevertheless, it is often difficult to achieve all the desired performance characteristics in a protective fabric for a specific application when fibers are used to form the protective fabric. For example, an aramid fabric has high tensile strength and is ballistic resistant, but the fabric is nevertheless weak against abrasion, degrades upon exposure to sunlight, and offers little puncture resistance against sharp, needle-like objects. As another example, fabrics made of nylon are strong and have good abrasion resistance, but the nylon fabric has low cut resistance against sharp edges as well has poor thermal and chemical (particularly acid) stability. In general, comprises usually have to be made when using a pure fabric, especially in high-performance fabric applications.

Recently, a new fabric design that integrates a fabric substrate with rigid, disconnected platelets or guard plates has been advanced by HDR, Inc. of St. Paul, Minn. and distributed under the trademark SuperFabric®. Generally, this fabric design includes a plurality of guard plates that are thin and formed of a substance chosen to resist a penetration force equivalent to that exerted by a cutting force of the level and type for which the fabric is to be used and for which it is designed. In a very convenient embodiment, a polymer resin is used as the material forming the guard plates. The resin can be printed on the fabric substrate in a design that thereby forms spaced-apart guard plates. The resin penetrates into the fabric substrate and when cured, forms a strong bond therewith. The composite nature of the fabric makes it possible to realize locally (in an area comprising one or a few guard plates) hard, puncture and cut resistant plate features. However, at the same time, the fabric exhibits global softness and flexibility due to the flexibility of the fabric substrate and the spaced apart relationship of the guard plates.

Although the guard plates are particularly hard and thereby resist puncture, fracture, or cutting, and when bonded to the fabric substrate, resist separation and prevent puncture or cutting between the guard plates, the characteristics that provide these features may not be entirely suitable for all applications. For instance, some applications may require a higher degree of wear resistance, while others require a tactile surface that improves grip. Accordingly, there exists a desire to address the needs of these applications.

SUMMARY OF THE INVENTION

One aspect of the present invention includes a fabric having a fabric substrate and a plurality of guard plate assemblies affixed to the fabric substrate in a spaced relationship to each other. Each guard plate assembly includes a first layer of material affixed to the fabric substrate and a second layer of material joined to the first layer of material on a surface opposite the fabric substrate. The second layer of material has characteristics different than the first layer of material and are chosen commonly to meet the demands of the application to which the fabric is designed. For instance, the second layer of material can have a surface property that is more resistant to wear than the first layer of material, whereas the first layer of material is chosen based on its ability to bond with the fabric substrate and/or resist puncture or cutting. In an alternative embodiment, the second layer of material can have a surface property that has higher friction than the first layer of material, which would allow, for example, the fabric to hold an article without slipping, for example, when the fabric is constructed as a glove. Generally, the multi-layer construction of the guard plate assemblies enables the fabric to be designed to meet a wide variety of durability, wear and tactile considerations through selection of the material forming the second layer, while still maintaining cut, pierce and puncture resistance requirements. Although discussed above where each guard plate assembly comprises two layers of material, it should be understood that additional layers can also be included in some or all of the guard plate assemblies.

A second aspect of the present invention includes a method of making a fabric comprising the steps of bonding spaced apart guard plates formed of a resin on a fabric substrate; and coating an upper surface of each of the guard plates with a second material that is different than the resin.

BRIEF DESCRIPTION OF THE DRAWINGS

FIG. 6 is a schematic sectional view of the embodiment of FIG. 5.

FIG. 7 is a schematic sectional view of a fifth embodiment of the fabric of the present invention.

DETAILED DESCRIPTION OF THE PREFERRED EMBODIMENTS

Figure 1:
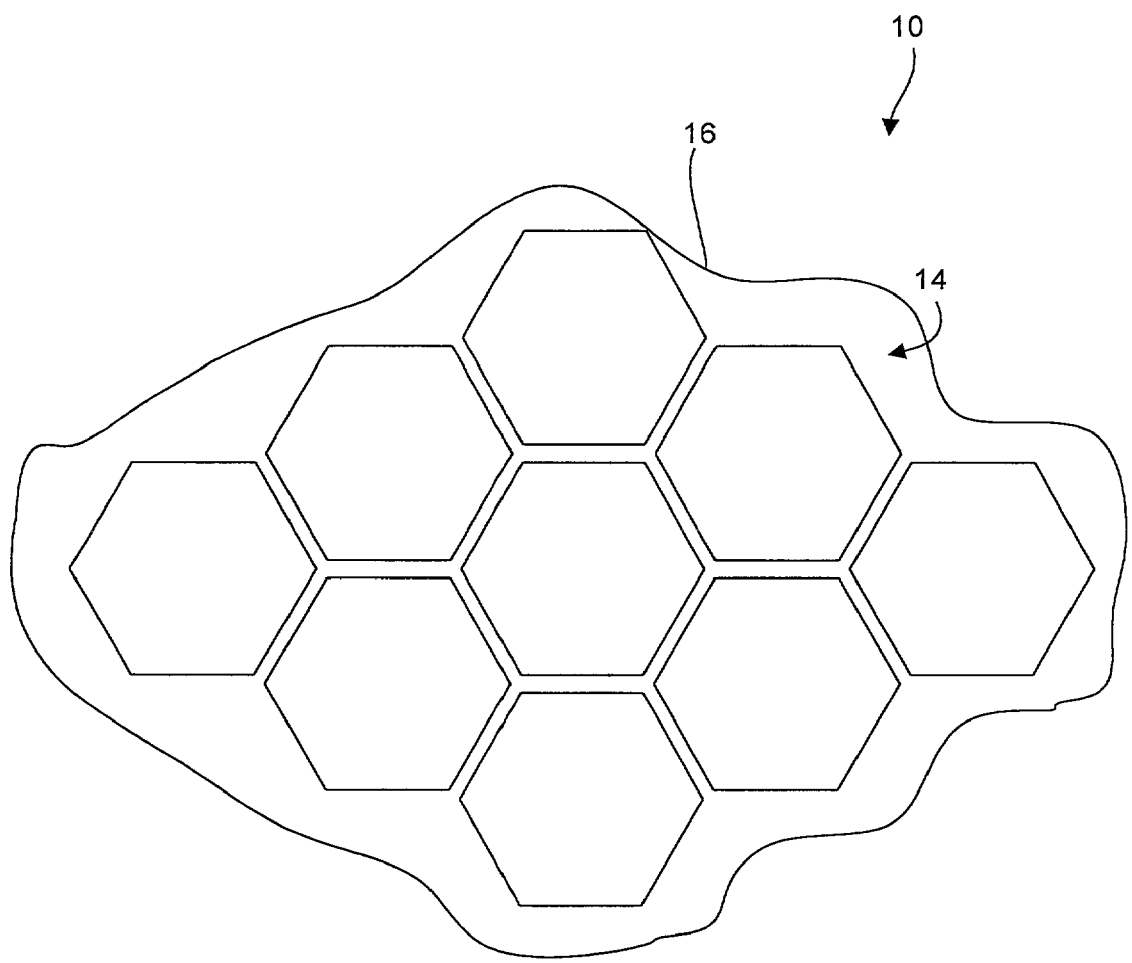
FIG. 1 is a top plan view of an exemplary fabric of the present invention having spaced-apart guard plate assemblies.
Figure 2:
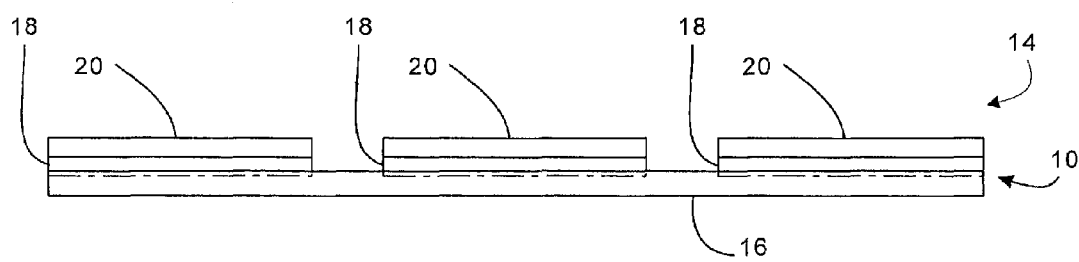
FIG. 2 is a schematic sectional view of a first embodiment of the fabric of the present invention.

FIGS. 1 and 2 illustrate a portion of an exemplary embodiment of a fabric 10 of the present invention. Generally, the fabric 10 includes a plurality of guard plate assemblies 14 affixed to a fabric substrate 16 in a spaced relationship to each other. Referring specifically to FIG. 2, each guard plate assembly 14 includes a first layer of material 18 affixed to the fabric substrate 16 and a second layer of material 20 joined to the first layer of material 18 on a surface 22 opposite the fabric substrate 16. A lesser extent of the height of each of the guard plates may penetrate the top surface of the fabric substrate 16. In the embodiment illustrated, each guard plate assembly 14 has an outer circumferential shape of a hexagon, which is only exemplary in that other shapes or other combination of shapes can be used. In addition, the arrangement of the guard plates can be of a regular and repeating pattern; however, in other arrangements, a random or irregular spaced-filling arrangement such as a Penrose tile arrangement can also be utilized. Also, each guard plate assembly 14, and the layers 18 and 20 forming the guard plate assemblies 14 can be planar, but need not be.

In one embodiment, each guard plate layer 18 and 20 can be constructed from various types of heat or ultraviolet (UV) cured resins wherein each component layer can primarily perform a different function in fabric, depending on the material used for the layer. The types of resin selected are determined by the demands of the particular application. Usually, the second layer 20 of the guard plate assembly 14 is selected for wear, durability or friction characteristics for a specific application. For example, some suitable second layer materials can include, but are not limited to, polyurethane 2040 or PVC Plastisol to provide a desired coefficient of friction, surface hardness, elasticity, or to provide increased wear resistance.

Commonly, the first or bottom layer 18 of the guard plate assembly 14 is a resin selected for its cut, pierce, or puncture resistance, durability and/or bonding characteristics to the fabric substrate 16 as well as its bonding characteristics to the top or second layer 20. One suitable material for the first layer 18 is an epoxy. Good adhesion or bonding to the fabric substrate 16 is desired because the fabric substrate 16 functions to limit the amount of space or gap 26 between adjacent guard plate assemblies 14, thereby inhibiting penetration of a sharp object through the gap 26. Gaps 26 are desired between adjacent guard plate assemblies 14 in order to maintain flexibility of the fabric 10, which allows the fabric 10 to exhibit properties of softness, bendability and twistability.

Although not directly concerning the concept of multi-layer guard plate assemblies, the fabric substrate 16 is typically also chosen to fulfill desired performance characteristics. For instance, the fabric substrate 16 can comprise a single layer of fabric (woven or non-woven), or include multiple layers as described in co-pending application Ser. No. 09/610,748, filed Jul. 6, 2000, which is hereby incorporated by reference in its entirety. Other considerations for the fabric substrate 16 can include compressibility and elastic properties. In some applications such as surgical gloves, the guard plate assemblies must be printed in a tight array with minimal space between each plate assembly to maximize the percentage of surface area that is protected. In response to this, a process mobilizing metal wire mesh (which does not cure under UV rays) is used. During the next step, a UV-curable resin flows through the metal wire mesh to adhere to the fabric. Once it is UV-cured, guard plates assemblies 14 are formed where the resin was, with gap areas left by the wire mesh. After this, the wire mesh is etched away, resulting in a tight guard plate assembly arrangement.

Figure 3:
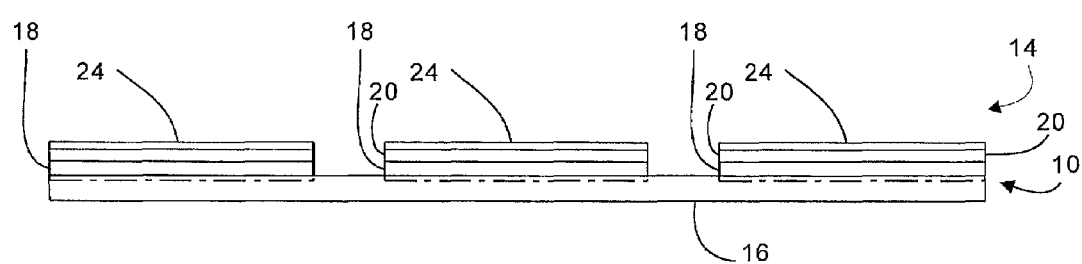
FIG. 3 is a schematic sectional view of a second embodiment of the fabric of the present invention.

Although the requirements of many applications can be accomplished by using a two-layered guard plate assembly. It should be understood that more layers, such as an additional layer of epoxy, can also be used as illustrated in FIG. 3 at 24. In addition, the guard plate assemblies 14 can include reinforcing elements such as particles and/or steel mesh. Metallic, ceramic or glass particles or beads can also be inserted into the guard plate layers to provide strength and durability.

The guard plate assemblies 14 are manufactured using a combination of curing and screen printing processes. The following is an illustration of how guard plate assemblies for paper handling gloves can be manufactured. In this example, the polymer resin used for the first layer 18 of each guard plate assembly 14 is a one-part heat-curable epoxy resin. The resin is in a paste-like state suitable for screen-printing and is set through heat curing at 120° C. degrees for one hour. The first layer 18 of each of the guard plate assemblies 14 provide cut/puncture protection and enhance the overall durability of the fabric 10. The second layer 20 of each guard plate assembly 14, in this exemplary embodiment, can be formed from a PVC Plastisol. The Plastisol generally comes in the form of liquid suspension of PVC particles. The PVC particles coalesce into a continuous matrix upon heating. The set temperature is at 320° F. for two minutes. The resulting layer 20 has a cured hardness of Shore A 80, yet the layer 20 is tacky to the touch and has a high friction coefficient against many dry surfaces such as paperboard.

The guard plate assemblies 14 are formed on the fabric substrate 16 using a screen-printing technique. A screen is first used to provide the first layer 18, which is then cured, or at least partially cured. When using the Plastisol as the second layer 20, Plastisol should be printed before the first layer 18 of epoxy is cured, or after the epoxy layer is only slightly cured in order to achieve good adhesion between the two guard plate layers 18 and 20. This can be achieved by using two screens, each with a different thickness. For example, the first screen can have a thickness of 300 microns, and the second screen can have a thickness of 700 microns. The screens can be mounted on two separate stations. The fabric substrate 16 is positioned on a print base that can be repositioned to the second print base with suitable registration. After the first print is done, the print base is rotated to the second print station. The control of registration is such that the print base maintains the space registration relative to the second printing screen as that relative to the first printing screen. With such control of registration, the second layer 20 can be deposited directly on top of the first layer 18.

Figure 4:
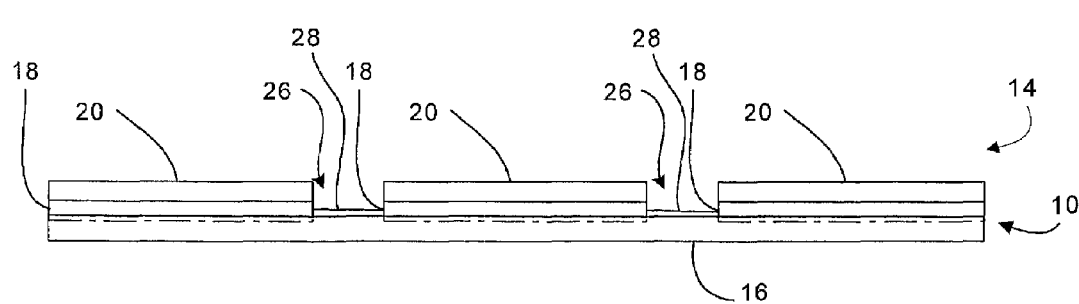
FIG. 4 is schematic sectional view of a third embodiment of the fabric of the present invention.

At this point, it should be noted that registration error can exist during printing of each of the layers 18 and 20, causing, for example, material forming the second layer 20 to partially fill or fill the gaps 26 between adjacent guard plate assemblies 14 as illustrated in FIG. 4. Although the additional material 28 in the gaps 26 may cause increased stiffness of the overall fabric 10, the fabric 10 still may have characteristics of flexibility that meet many applications. Therefore, it should be understood that in alternative embodiments of the present invention, partial filling or even filling of the gaps 26 between at least some of the guard plate assemblies 14 is still considered part of the present invention, particularly, if the material forming the second layer 20 is flexible. Similarly, although complete coverage of the first layer 18 of material by the second layer 20 of material is generally desired. In some applications, substantial coverage (greater than 75% coverage of the area of the first layer) may still be adequate for some applications. Although described above with respect to using two print stations, a multiple layer guard assembly 14 can also be created by other forms of coating the first layer 18, such as by spraying the material of the second layer 20 over the first layer 18, after the first layer 18 has been bonded to the fabric substrate 16.

Figure 5:
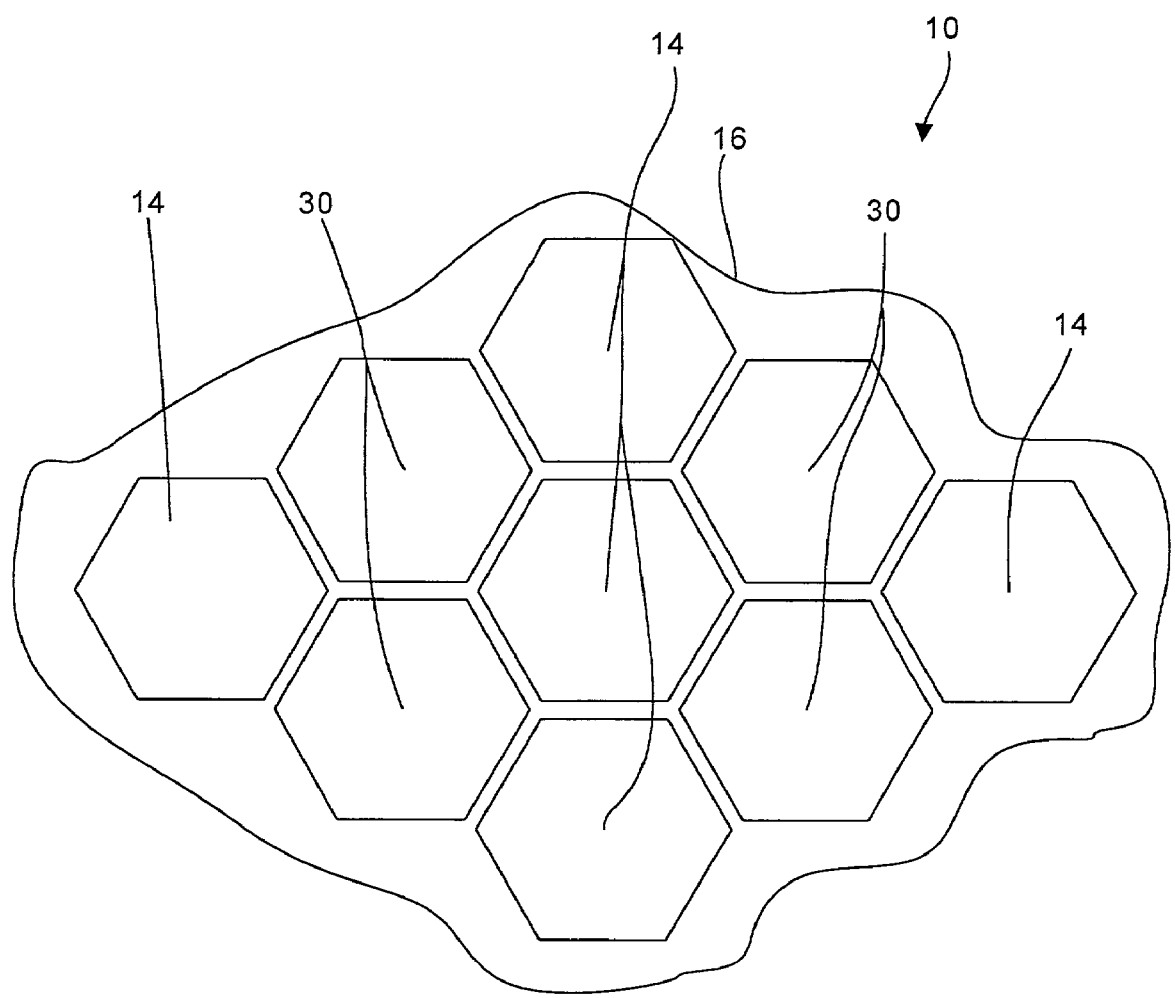
FIG. 5 is a top plan view of a fourth exemplary fabric of the present invention having spaced-apart guard plate assemblies.

In yet another alternative embodiment as illustrated in FIGS. 5 and 6, the fabric 10 can include a second plurality of guard plate assemblies 30 having a second layer or upper layer 32 that is different than the second layer 20 of the first plurality of guard plate assemblies 14. In the embodiment illustrated, the second plurality of guard plate assemblies 30 can be a multi-layer guard plate assembly having construction similar to the first-mentioned plurality of guard plate assemblies 14, or alternatively, be a single layer, for example, formed only of the same material as used as in the first layer 18. This construction may be helpful when a particular application requires a softer or tackier surface (provided in this example by the second layer 18 of material) in order to provide sufficient friction for contact with dry surfaces, while for wet surfaces, a harder surface property is desired, which is provided by the second plurality of guard plate assemblies 30.

Another unique feature of the guard plate assembly 14 design is that the manufacturing technique for the guard plate assemblies 14 can be modified to customize the morphology or structure of the guard plate assemblies 14. The following illustrates how the guard plate assemblies 14 can be constructed with the second layer 20 having a smooth curved surface, which can be ideal for abrasion for resistant toes of industrial or outdoor boots. When using resins such as epoxy, it is often difficult to create a smooth surface due to the high viscosity of the epoxy resin. In this embodiment, the resin used for the smooth upper surface layer is either diluted, or a lower viscosity resin is chosen to make it less difficult to form as a layer. The second layer or upper layer 20 of resin is placed upon the first or lower layer 18 of resin, which is plate-like in shape. The second layer 20 spreads and generally distributes evenly into a smooth curved-like shape with edges of the second layer 20 generally coincident with the edges of the first layer 18. Edge registration between the layers 18 and 20 is obtained due to a "pinning" effect when liquids are placed on a flat surface that has edges that sharply drop off. In other words, the edges tend to hold back or "pin" the liquid at the edges. In addition, the surface tension effect causes the second layer 20 to form a smooth curved surface as in FIG. 7. Both layers 18 and 20 of resin are held in place by using a different screen print underneath each layer, and the second layer 20 is then deposited onto the first layer 18. The resulting multi-layered guard plate assembly is smooth on the surface for a scratch-free and aesthetic properties, as well as cut and abrasion resistant.

Although the present invention has been described with reference to preferred embodiments, workers skilled in the art will recognize that changes may be made in form and detail without departing from the spirit and scope of the invention.

What is claimed is:

1. A flexible fabric comprising a woven fabric substrate and a plurality of guard plate assemblies affixed to a top surface of the fabric substrate in a fixed relationship to each other to maintain a selected gap size, each guard plate assembly including a first layer of material affixed to the top surface of the fabric substrate, the first layer of each guard plate assembly collectively providing a first plurality of non-overlapping, polygonal guard plates penetrating at least the top surface of the fabric substrate to affix the guard plates to the fabric substrate, and a second layer of material joined to the first layer of material on a surface opposite the fabric substrate, wherein the second layer of material collectively provides a second plurality of non-overlapping guard plates registered relative to the first plurality of plates, wherein some of the gaps between the guard plate assemblies include material corresponding to the second layer of material.

2. The fabric of claim 1, wherein each of the second plurality of plates completely covers the surface of the corresponding first plurality of plates.

3. The fabric of claim 1, wherein in at least some of the plurality of guard plate assemblies, the second layer of material does not completely cover the surface of the corresponding first layer of material.

4. The fabric of claim 1 wherein some of the gaps are filled with material corresponding to the second layer of material.

5. The fabric of claim 1 and further comprising a second plurality of guard plate assemblies affixed to the fabric substrate, each guard plate assembly of the second plurality having an upper surface formed from a material different than the material of the second layer.

6. The fabric of claim 5 wherein the upper surface of each of the second plurality of guard plate assemblies is formed from the first material.

7. The fabric of claim 1 wherein the guard plate assemblies include a third layer of material joined to a surface of the second layer of material, the third layer of material being different than the second layer of material.

8. The fabric of claim 1, wherein a lesser extent of height of each of the plurality of polygonal guard plates penetrate the top surface of the fabric substrate.

9. The fabric of claim 1, wherein the plurality of polygonal guard plates define a plurality of approximately linear gaps between adjacent plates, and wherein each of the linear gaps is approximately uniform in width.

10. The fabric of claim 1, wherein the guard plate assemblies include a third layer of material joined to a surface of the second layer of material, the third layer of material being different than the second layer of material.

11. A flexible fabric comprising a woven fabric substrate and a plurality of guard plate assemblies affixed to a top surface of the fabric substrate in a fixed relationship to each other to maintain a selected gap size, each guard plate assembly including a first layer of material affixed to the top surface of the fabric substrate, the first layer of each guard plate assembly collectively providing a first plurality of non-overlapping, polygonal guard plates penetrating at least the top surface of the fabric substrate to affix the guard plates to the fabric substrate, and a second layer of material joined to the first layer of material on a surface opposite the fabric substrate, wherein the second layer of material collectively provides a second plurality of non-overlapping guard plates registered relative to the first plurality of plates, wherein the second layer of material has a surface property that has higher friction than the first material.

12. A fabric comprising a woven fabric substrate and a single layer of non-overlapping guard plate assemblies affixed to a top surface of the fabric substrate, wherein each guard plate assembly includes a printed polygonal shaped first layer of material directly joined to the top surface of the fabric substrate, and a second layer of material joined to the first layer of material opposite the fabric substrate, wherein the printed first layer of material is joined directly to the top surface of the fabric substrate, and wherein adjacent polygonal shaped first layers of material are separated by linear gaps each having an approximately uniform width and maintain a fixed relationship relative to one another, wherein the printable first layer of material comprises epoxy, wherein in at least some of the plurality of guard plate assemblies, the second layer of material does not completely cover the surface of the corresponding first layer of material.

13. The fabric of claim 12 wherein the second layer of material has a surface property that is more resistive to wear than the first layer of material.

14. A fabric comprising a woven fabric substrate and a single layer of non-overlapping guard plate assemblies affixed to a top surface of the fabric substrate, wherein each guard plate assembly includes a printed polygonal shaped first layer of material directly joined to the top surface of the fabric substrate, and a second layer of material joined to the first layer of material opposite the fabric substrate, wherein the printed first layer of material is joined directly to the top surface of the fabric substrate, and wherein adjacent polygonal shaped first layers of material are separated by linear gaps each having an approximately uniform width and maintain a fixed relationship relative to one another, wherein the printable first layer of material comprises epoxy, wherein the guard plate assemblies include a third layer of material joined to a surface of the second layer of material, the third layer of material being different than the second layer of material.

15. The fabric of claim 14, wherein the second layer of material has a surface property that is more resistive to wear than the first layer of material.

* * * * *